Sept. 9, 1969 P. ZUK 3,465,793
CONVERTIBLE SAW
Filed Aug. 17, 1966 3 Sheets-Sheet 1
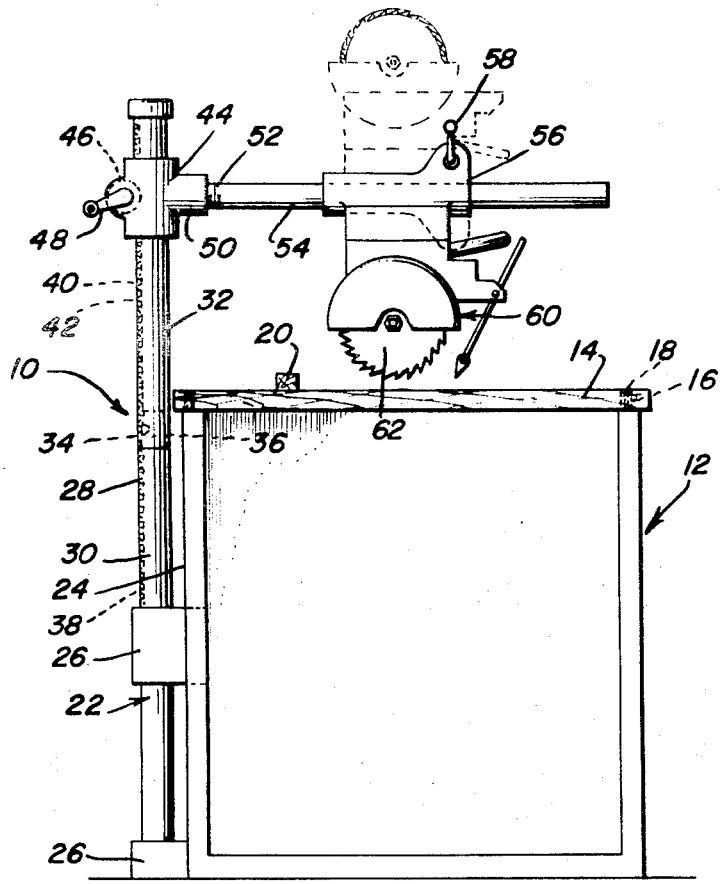
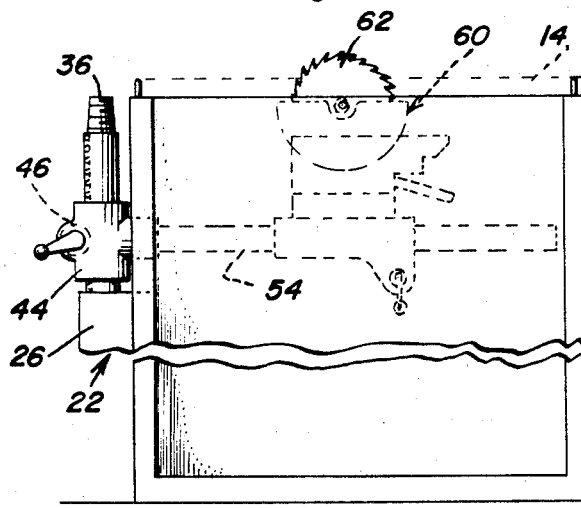
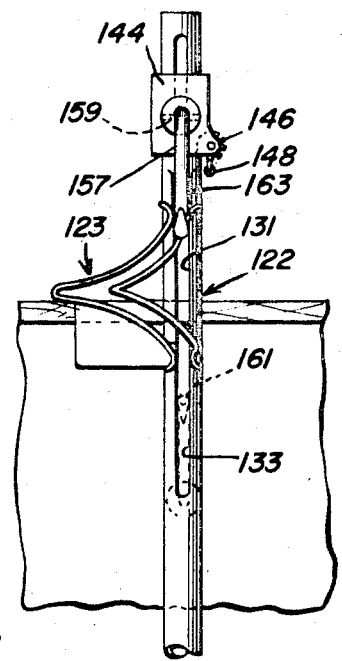
Peter Zuk
INVENTOR.

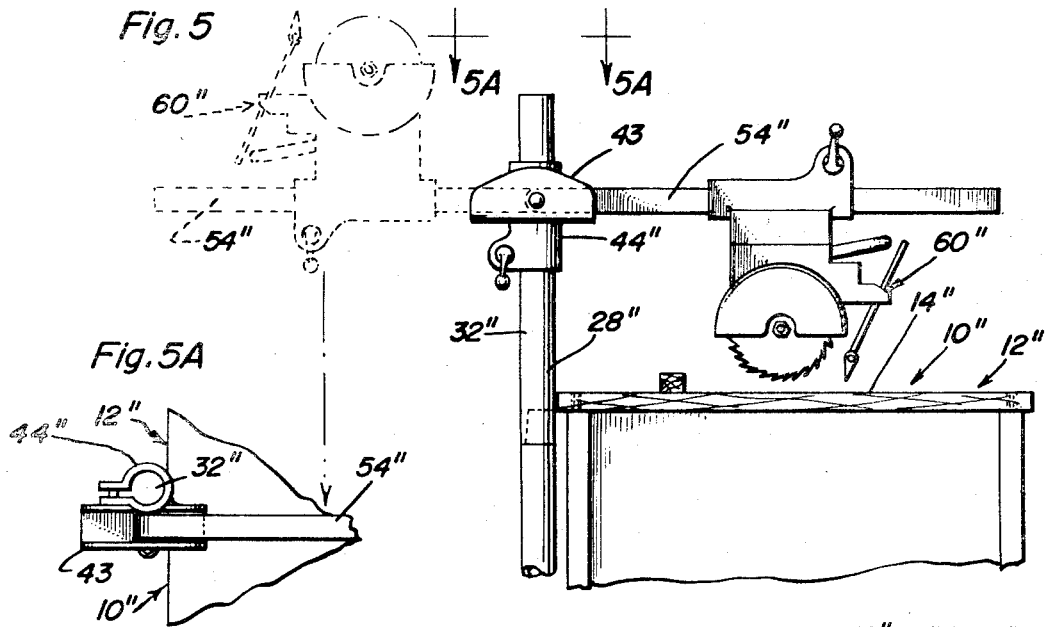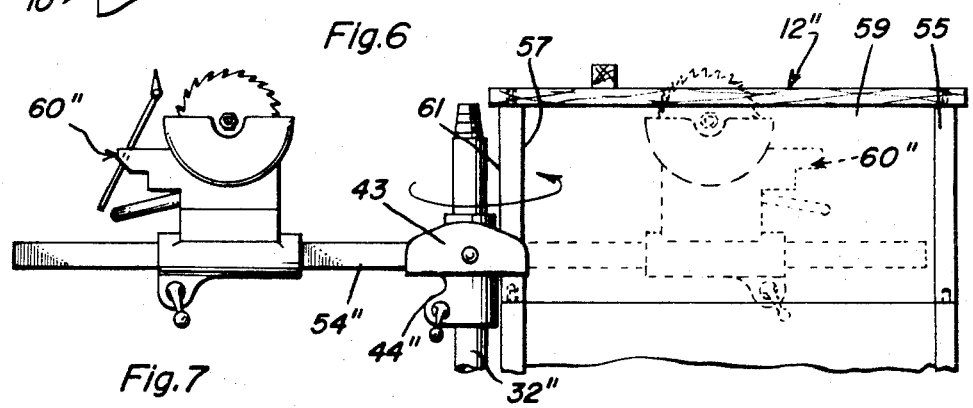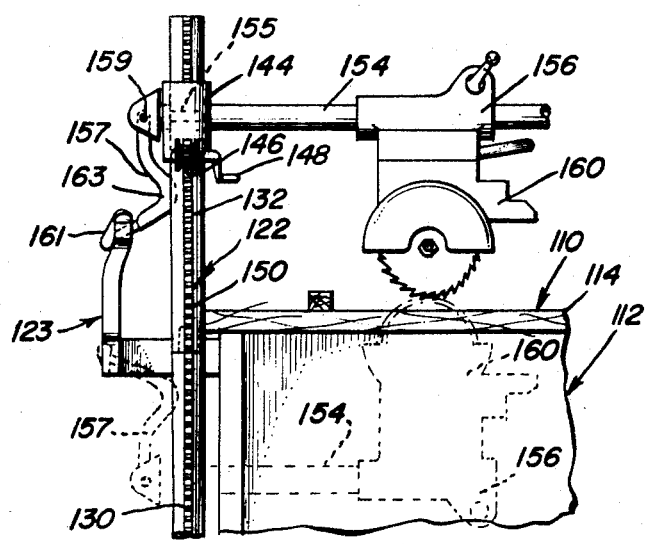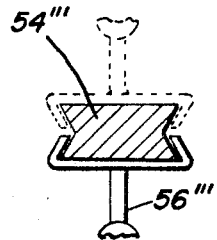
Peter Zuk
INVENTOR.

Sept. 9, 1969　　　　　　　　P. ZUK　　　　　　　　3,465,793
CONVERTIBLE SAW
Filed Aug. 17, 1966　　　　　　　　　　　　　　3 Sheets-Sheet 3
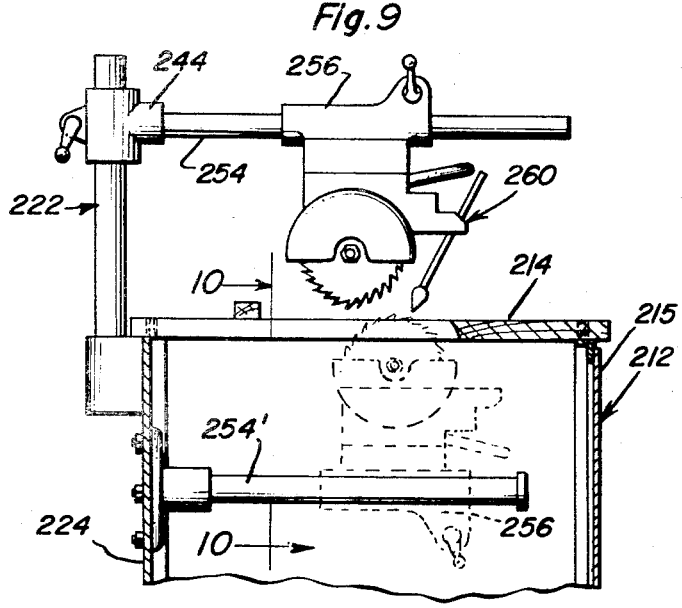
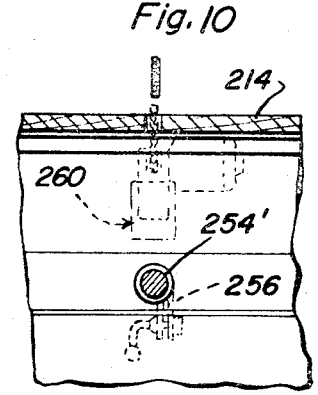
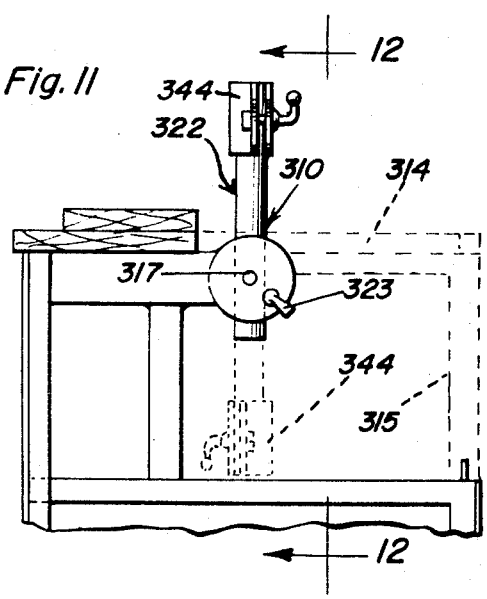
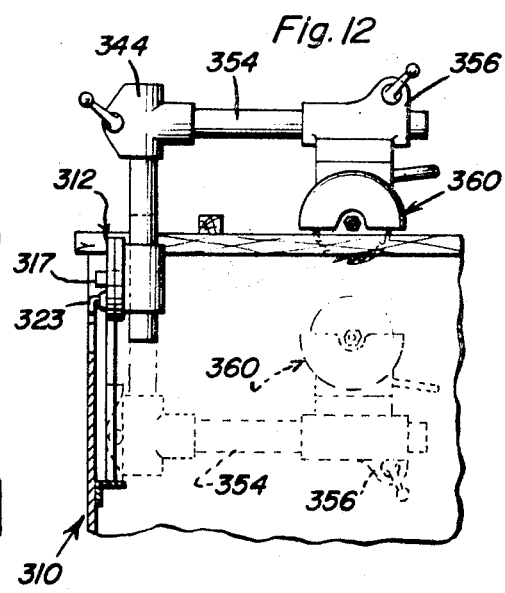
Peter Zuk
INVENTOR.

United States Patent Office 3,465,793
Patented Sept. 9, 1969

3,465,793
CONVERTIBLE SAW
Peter Zuk, Cressona, Pa.
(R.F.D. 3, Pottsville, Pa. 17901)
Filed Aug. 17, 1966, Ser. No. 573,119
Int. Cl. B27b 15/06, 27/06, 5/18
U.S. Cl. 143—1
12 Claims

ABSTRACT OF THE DISCLOSURE

A convertible saw including a table top having a blade receiving opening therethrough. An upright is supported adjacent and projects above the table top and has a follower mounted thereon for movement therealong including a horizontal arm having an outer end portion disposed above the table top along which a mounted circular saw is movable. The circular saw is shiftable, independent of removal of the arm from the follower and the circular saw from the arm, from above the table top to a position therebelow with the blade of the saw projecting upwardly through the blade receiving opening.

---

This invention relates to a novel and useful convertible saw and more specifically to a saw structure including a circular saw assembly of the type conventionally utilized in a radial-arm saw structure. The saw structure of the instant invention, in one form thereof, defines a radial-arm saw structure but in another form thereof defines a circular table saw.

Each modification of the saw structure disclosed herein is capable of being readily transformed from the radial-arm saw defining form thereof to the table saw defining form thereof and the various modifications of the saw structure disclosed herein merely include different structural features for shifting the circular saw assembly of the saw structure from its radial-arm saw defining position to its table saw defining position.

There are certain sawing operations which can be best performed by radial-arm saws and other sawing operations which may be best performed by table saws. However, table saws and radial-arm saws are each expensive to purchase and therefore, for economy reasons, the owner of a table saw must often attempt to perform those operations best performed by a radial-arm saw with his table saw and likewise a radial-arm owner quite often attempts to perform sawing operations best performed by a table saw with his radial-arm saw.

In order to appreciably reduce the expense involved in a person acquiring both a radial-arm saw and a table saw, it is the main object of this invention to provide a saw structure including a circular saw assembly which may be readily shifted in position from a radial-arm saw defining position to a table saw defining position.

It is a further object of this invention, in accordance with the immediately preceding object, to provide a combination saw structure which may be readily produced at a cost only slightly more than the cost of a comparable radial-arm saw.

A final object of this invention to be specifically enumerated herein is to provide a saw structure in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a first form of saw structure constructed in accordance with the present invention with the circular saw assembly thereof supported so as to define a radial-arm saw;

FIGURE 2 is a fragmentary side elevational view of the assemblage illustrated in FIGURE 1 but illustrating the manner in which the circular saw assembly may be shifted in position so as to define a table saw;

FIGURE 3 is a fragmentary side elevational view illustrating a slightly modified form of the structure illustrated in the upper left hand portion of FIGURE 1;

FIGURE 4 is a vertical sectional view of a modified form of support arm for a saw assembly such as that illustrated in FIGURES 1 and 3 with an inverted position of the associated circular saw assembly illustrated in phantom lines;

FIGURE 5 is a fragmentary side elevational view of a second form of saw structure constructed in accordance with the present invention and including a vertically swingable support arm for the corresponding circular saw assembly which may be readily lowered and then pivoted about a vertical axis to shift the associated circular saw assembly from a radial-arm saw defining position to a table saw defining position;

FIGURE 5A is a fragmentary top plan view taken substantially upon the plane indicated by the section line 5A—5A of FIGURE 5;

FIGURE 6 is a further side elevational view of the embodiment illustrated in FIGURE 5 shown with the support arm for the circular saw assembly in an inverted position and lowered relative to the associated table top in readiness for swinging to a position disposed beneath the table top;

FIGURE 7 is a fragmentary side elevational view of a third form of saw structure constructed in accordance with the present invention;

FIGURE 8 is a fragmentary rear elevational view of the assemblage illustrated in FIGURE 7;

FIGURE 9 is a fragmentary side elevational view of a fourth form of saw structure constructed in accordance with the present invention with portions of the cabinet of the saw structure illustrated in vertical section and an alternate position of the circular saw assembly therof defining a table saw illustrated in phantom lines;

FIGURE 10 is a fragmentary vertical sectional view taken substantially upon the plane indicated by the section line 10—10 of FIGURE 9;

FIGURE 11 is a fragmentary rear elevational view of a fifth form of saw structure constructed in accordance with the present invention and with portions of the associated cabinet structure being broken away and an alternate position of the circular saw assembly supporting portion thereof illustrated in phantom lines; and FIGURE 12 is a vertical sectional view taken substantially upon the plane indicated by the section line 12—12 of FIGURE 11.

Referring now more specifically to the drawings, the numeral 10 generally designates a saw structure constructed in accordance with the present invention and including a base cabinet generally referred to by the reference numeral 12 provided with a removable top wall section 14 having suitable upstanding bores 16 formed therethrough for the reception of locating pins 18 supported from the side walls of the cabinet 12.

The top wall section 14 may include a fence 20 and an upstanding standard assembly generally referred to by the reference numeral 22 is supported from the rear wall 24 of the cabinet 12 in any convenient manner such as by suitable mounting brackets 26. The standard assembly 22 includes a standard element 28 comprising a lower section 30 supported from the mounting brackets 26 and an upper section 32 including a threaded bore 34 at its lower end for seatingly and threadedly receiving a dimetrically reduced externally threaded shank portion 36 carried by the upper end of the lower section 30. The lower and upper sections 30 and 32 includes grooves 38 and 40 which are registrable with each other and include rack gear teeth 42.

A collar 44 is mounted on the standard element 28 and rotatably supports a gear wheel 46 therefrom operable by means of a crank 48 and engaged with the rack gear teeth 42 thereby enabling the collar 44 to move up and down the standard element 28 by rotation of the crank 48. The collar 44 includes a hollow neck portion 50 which projects laterally therefrom and which is internally threaded. An externally threaded end portion 52 of a cylindrical support arm 54 is threadedly engaged in the end portion 52 and has mounted thereon a split clamp mounting assembly 56. The mounting assembly 56 is slidable along the cylindrical arm 54 and also rotatably received on the latter. Further, the assembly 56 is provided with a clamp actuator handle 58 which may be utilized to cause the assembly 56 to clampingly engage the arm 54 against movement relative thereto.

A circular saw assembly generally referred to by the reference numeral 60 is pivotally supported from the assembly 56 for rotation about an upstanding axis disposed at right angles relative to the arm 54 and also for angular adjustment about a horizontal axis disposed normal to the first-mentioned axis of rotation of the assembly 60 relative to the assembly 56.

With attention now invited to FIGURE 2 of the drawings it may be seen that the collar 44 may be moved to a position below the normal position of the top wall section 14 after the latter has been removed and that the mounting assembly 56 may be inverted so as to shaft the circular saw assembly 60 from the radial-arm saw defining position illustrated in FIGURE 1 of the drawings to a table saw defining position such as that illustrated in FIGURE 2 of the drawings. Of course, it is to be noted that the top wall section 14, which is removable, may be provided with a suitable slot (not shown) for receiving the saw blade 62 of the assembly 60 in order that the saw blade 62 may project upwardly above the top wall section 14.

If it is desired, the upper section 32 of the standard element 28 may be removed during usage of the circular saw assembly 60 as a table saw. It will be noted that the shank portion 36 terminates upwardly a spaced distance below the plane containing the upper surface of the top wall section 14 and therefore that extremely wide and/or long workpieces may be supported from the top wall section 14 without interference with the standard element 28 when the upper section 32 is removed.

With attention now invited more specifically to FIGURE 3 of the drawings there may be seen a modified form of collar similar to the collar 44 and designated by the reference numeral 44'. The collar 44', instead of including an internally threaded neck portion such as the neck portion 50, includes a split clamp-type neck portion 50' including an operating handle 51. Further, the collar 44', instead of utilizing an externally threaded support arm such as support arm 54, is provided with a support arm 54' including a smooth end portion and which may be clamped in the neck portion 50 in adjusted rotated position by means of the operating handle 51.

With attention now invited to FIGURE 5 of the drawings there will be seen a still further modified form of the saw assembly referred to in general by the reference numeral 10" and which includes a standard element 28" corresponding to the standard element 28 but which does not include rack teeth. The standard element 28" includes a vertically adjustable collar 44" similar to the collar 44 but which is of the split clamp type and includes a channel-shaped portion 43 in which one end of a modified support arm 54" is pivotally secured for swinging movement through an arc of 180° between the solid line position thereof illustrated in FIGURE 5 and the dotted line position thereof illustrated in FIGURE 5. In addition, since the collar 44" is of the split clamp type it therefore does not include a gear comparable to gear 46 nor does the standard element 28" include gear teeth corresponding to gear teeth 42. However, the standard element 28" does include a removable upper section 32" corresponding to the removable upper section 32. Of course, the cabinet 12" is substantially identical to the cabinet 12 and therefore includes a removable top wall section 14" corresponding to the removable section 14. Accordingly, from a comparison of FIGURES 5, 5A and 6 of the drawings it may be seen that the circular saw assembly 60" may be readily swung from the solid line position illustrated in FIGURE 5 of the drawings to the dotted line position thereof and thereafter lowered to a position disposed below the top wall section 14". Then, the collar 44 may be swung about the standard element 28" so as to shift the circular saw assembly 60" from the position thereof illustrated in solid lines in FIGURE 6 of the drawings to the position thereof illustrated in phantom lines in FIGURE 6 of the drawings, the removable top wall section 14" having secured thereto removable corner post sections 55 and 57 in addition to a removable wall section 59 and a removable back wall section 61 of the cabinet 12". The removable sections 14", 55, 57, 59 and 61 of course enable the support arms 54" to swing from the solid line position illustrated in FIGURE 6 to the phantom line position illustrated in FIGURE 6 at which time the removable wall section and corner post sections may be replaced.

With attention now invited more specifically to FIGURES 7 and 8 of the drawings, there will be seen a convertible saw generally referred to by the reference numeral 110 and which includes a cabinet generally referred to by the reference numeral 112 corresponding to the cabinet 12. A standard assembly generally referred to by the reference numeral 122 is provided and is similar in construction to the standard assembly 22 except that a horizontally disposed generally V-shaped guideway assembly referred to in general by the reference numeral 123 and supported from the cabinet 112 is operatively associated therewith.

The standard assembly 122 includes gear teeth 150 and lower and upper sections 130 and 132 slotted as at 131 and 133, respectively, corresponding to the sections 30 and 32 and a collar 144 similar to the collar 44 including a rotatable supported support arm 154 for the circular saw assembly 160 provided with a diametrically reduced portion 155 rotatably and slidably received in the slots 131 and 133, the assembly 160 being provided with a mounting assembly 156 similar to the mounting assembly 56 and which is slidably and rotatably mounted on the support arm 154.

However, the rear end of the support arm 154 has a crank lever 157 pivotally secured thereto as at 159 and the free end of the lever 157 includes a follower 161 slidably engageable with the guideway assembly 123 and a curved portion 163 slidable in the slots 131 and 133. The follower 161 is operative to engage the guideway assembly at its upper and lower ends to cam the curved portion 163 out of the slots 131 and 133 of the standard assembly 122. Of course, the collar 144 includes a journaled gear wheel 146 corresponding to the gear wheel 46 and rotatable by means of a hand crank 148 and the gear wheel is meshed with rack gear teeth 150 formed in the lower and upper sections 130 and 132.

The follower end portion 161 of the crank lever 157 upon downward movement of the collar 144, is engageable with the guideway assembly 123 to cam the curved portion 163 out of the slot 131 and to shift the crank or lever 157 from the downwardly directed position to the upwardly directed position illustrated in phantom lines in the lower portion of FIGURE 8 thereby automatically rotating the support arm 154 180° as the crank 148 is rotated to lower the collar 144. Of course, the circular saw assembly 160 will then be shifted from the upright position illustrated in FIGURE 7 of the drawings to an inverted position similar to the inverted position of the circular saw assembly 60 illustrated in FIGURE 2 of the drawings. Still further, the cabinet 12 is of course provided with a removable top wall section 114 corresponding to the top wall section 14 as well as a slotted or removable rear wall section so as to provide clearance for the circular saw assembly 160 and the support arm 154 as they are lowered from the elevated position illustrated in FIGURE 7 of the drawings above the cabinet 112 to a lowered position disposed below the mounted position of the top wall 114.

With attention now invited to FIGURE 4 of the drawings there may be seen a support arm 54''' which may be utilized in lieu of the support arm 54 and which includes a cross-sectional shape adapting a modified mounting assembly 56''' corresponding to the mounting assembly 56 to be readily inverted thereon.

With attention now invited to FIGURES 9 and 10 of the drawings there may be seen yet another embodiment of the invention including a cabinet generally referred to by the reference numeral 212 including a top wall section 214 corresponding to the top wall section 14 and a removable front panel 215. The cabinet 212 supports a modified form of standard assembly generally referred to by the reference numeral 222 and the upper end of the standard assembly 222 has a collar 244 slidably mounted thereto for vertical adjustment therealong and the collar 244 supports a support arm 254 corresponding to the support arm 54 and which has a circular saw assembly 260 mounted thereon corresponding to the circular saw assembly 60. The mounting assembly 256 of the circular saw assembly 260 is slidably disposed on the support arm 254 and is slidable off the free end of the support arm 254 and thereafter replaceable on a second support arm 254' supported from and projecting forwardly of the rear wall 224 of the cabinet 212. Accordingly, it may be seen that the circular saw assembly 260 may be readily shifted from the elevated upright position illustrated in solid lines in FIGURE 9 of the drawings to a lowered inverted position disposed below the top wall section 214 so as to have the saw blade thereof project upwardly through the top wall section 214.

Referring now more specifically to FIGURES 11 and 12 of the drawings there will be seen a final embodiment of the invention generally referred to by the reference numeral 310 and including a cabinet generally referred to by the reference numeral 312. The cabinet 312 includes a support standard 322 supported at one end for oscillation about a horizontal axis extending between the front and rear portions of the cabinet 312 and retained in adjusted rotated positions by means of a suitable clamp actuating lever 323. A circular saw assembly generally referred to by the reference numeral 360 is supported from a support arm 354 carried by a collar 344 vertically adjustable on the support standard 322 by means of a mounting assembly 356. The cabinet 312, in addition to including a removable top wall section 314 corresponding to the top wall section 14, includes a removable side wall portion 315 thereby enabling the entire standard assembly 322 to be pivoted about the pivot pin 317 in order to shift the circular saw assembly 360 from the elevated solid line position illustrated in FIGURE 12 of the drawings to the lowered dotted line position illustrated in FIGURE 12.

Thus it may be seen that each of the embodiments of the invention illustrated and disclosed herein are capable of supporting a circular saw assembly in a radial-arm saw defining position above a work supporting surface and also in a table saw defining position disposed below a work supporting surface.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A convertible saw structure comprising a support table including a workpiece supporting top wall having a removable section, a power saw assembly including a motor and a saw blade driven by said motor, means, including an upright standard supported from said table, a follower mounted on said upright for movement therealong and a horizontal support arm having one end portion supported from said follower and upon which said saw assembly is slidably mounted, supporting said saw assembly above said table, means for shifting said saw assembly between a first elevated upright position above said top wall of said table and a second lower inverted position disposed below said top wall independent of removal of said arm from said follower and said saw assembly from said arm, said top wall having a blade receiving opening formed therethrough, said blade projecting below said saw motor when said assembly in said elevated position for cutting work disposed on said top wall and said blade projecting above said motor and upwardly through said slot when said assembly is in said inverted lowered position.

2. The combination of claim 1 wherein said saw assembly includes a mount from which said motor and blade are pivotally supported as a unit for pivotal adjustment relative to said mount.

3. The combination of claim 1 wherein said saw assembly is supported from said arm for selective inversion relative to said arm so as to be operative to be inverted when said arm is in said second position.

4. The combination of claim 1 wherein said lower end portion of said standard is pivotally supported from said table for rotation about an axis generally paralleling said arm for pivotal movement of said standard about said axis to invert said standard, said arm and said saw assembly with the latter disposed beneath said top of said table.

5. The combination of claim 4 wherein said saw assembly includes means operative to releasably lock said saw assembly in adjusted position along said arm.

6. The combination of claim 5 wherein said standard includes means operative to releasably lock said standard in selected rotated position relative to said table.

7. The combination of claim 1 wherein said support arm is supported from said follower for rotation relative thereto about the longitudinal axis of said arm, said saw assembly being mounted on said arm for vertical and rotational adjustment therewith.

8. The combination of claim 1 wherein the end of said arm adjacent said follower is threadedly engaged with the latter.

9. The combination of claim 7 wherein said follower includes means operative to releasably retain said arm in adjusted rotated positions relative thereto.

10. The combination of claim 1 wherein said support follower is rotatable relative to said standard about the longitudinal axis of the latter, said arm being pivotally supported from said standard for rotation about an axis extending transversely of said arm and standard between two generally horizontal positions rotated approximately 180° relative to each other.

11. The combination of claim 1 wherein said support arm is rotatably supported from said follower for rotation about its longitudinal axis, coacting means supported from said table and carried by said arm operative to rotate said arm 180° relative to said follower in response to lowering said follower from an upper position with said arm disposed above the top of said table to a lower position with said arm disposed below the level of the top of said table.

12. The combination of claim 1 wherein said follower is lowerable along said standard to a position with said arm disposed below the level of the top of said table, said saw assembly being selectively slidably supported from said arm for movement therealong in two positions inverted relative to each other.

References Cited

UNITED STATES PATENTS 2,803,271   8/1957   Shaw.

DONALD R. SCHRAN, Primary Examiner